UNITED STATES PATENT OFFICE.

RUDOLF HUTZLER, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION OF BADEN.

TREATING INSOLUBLE INDIGOID DYES.

1,188,543. Specification of Letters Patent. Patented June 27, 1916.

No Drawing. Application filed September 26, 1913. Serial No. 791,948.

*To all whom it may concern:*

Be it known that I, RUDOLF HUTZLER, citizen of the German Empire, residing at Ludwigshafen-on-the-Rhine, Germany, have invented new and useful Improvements in Treating Insoluble Indigoid Dyes, of which the following is a specification.

The specification of Patents Nos. 1,058,019, 1,058,020 and 1,057,886 describe the production of finely divided indigoid dyestuffs by producing the said dyes from their leuco compounds in the presence of aromatic compounds, for instance benzylated acids, including benzyl sulfanilic acid and benzyl-anilin sulfonic acid, and also in the presence of aldehydes or phenols and the like. The specification of the said Patent No. 1,058,019 also claims as a new product the physical form of indigo which, when made into a paste and diluted with water, yields a deep blue liquid settling with difficulty and giving a blue filtrate when filtrated.

I have now found that I can obtain indigoid coloring matters, that is to say coloring matters of the indigo and thioindigo groups, in a colloidal form soluble in water, that is to say in such a form that the said coloring matters do not settle at all and cannot be separated by filtration from their alkaline or neutral solutions, including solutions such as are produced according to the present invention. In order to secure these results, I pass air through a cold solution of a leuco compound of one of the said coloring matters in the presence of a salt of aromatic acid including aromatic sulfonic acids and carboxylic acids, the reaction being carried out so slowly that only an oxidation to, but not a separation of the coloring matter takes place. As aromatic acids being particularly suitable for use according to my invention, I mention benzylated aminosulfonic acids, phenol-sulfonic acids and also condensation products obtained from phenol-sulfonic acids either with or without the assistance of formaldehyde, as described for instance in the specifications of applications for patent Serial Nos. 716,020 and 743,297, and also soluble aromatic sulfonic acids of an amorphous character which contain no phenolic hydroxyl group and which can be obtained, for example, according to the specification of the British application for Patent No. 7137/13 from naphthalene-sulfonic acids and formaldehyde and the like. The resulting solution or product obtained as aforesaid contains the coloring matter in a state of fine division such that the coloring matter has no tendency to settle out of the solution. This solution can be evaporated or the coloring matter can be precipitated by means of acid without its capability of dissolving in water being lost.

The following examples will serve to illustrate further the nature of my invention and how it can be carried into practical effect, but the invention is not confined to these examples.

Example 1: Dissolve 3 kilos of the sodium salt of benzyl-anilin-sulfonic acid in 30 liters of water and then, while stirring at ordinary temperature and passing a slow current of air through the solution, allow 60 kilos of a solution of the sodium salt of indigo-white, corresponding to 6 kilos of indigo, to flow into the solution during a period of about 48 hours. Filter the solution obtained, wash it in an osmotic apparatus and then evaporate it. The indigo obtained can be precipitated from the solution by means of acid without losing its capability of forming an unfilterable solution in water. In a similar manner, other aromatic sulfonic acids of the kind hereinbefore described can be employed.

Example 2: Dissolve 2.5 kilos of the neutralized reaction product of formaldehyde and cresol-sulfonic acid (obtained as described in the specification of application for patent Serial No. 716,020) in 20 liters of water. In the course of 48 hours allow 60 kilos of a 10% sodium salt indigo white solution (corresponding to 6 kilos of indigo) to run in while stirring and blowing a current of air through the mixture. Then filter the blue solution so obtained, wash it in an osmotic apparatus and evaporate it to dryness.

Example 3: Dissolve 3 kilos of the reaction product of formaldehyde and naphthalene-beta-sulfonic acid in 30 liters of water and 1 kilo of a 10% caustic soda solution, and then during a period of 48 hours allow 60 kilos of a 10% solution of the sodium salt of indigo white to run in while stirring the mixture continuously and passing a slow current of air through it. Filter the resulting solution through calico, acidify the filtrate with dilute acetic acid whereupon the indigo is precipitated and filter off the indigo by means of felt; wash the pasty filter residue in an osmotic apparatus whereby the precipitated colloidal indigo goes into solution and evaporate the solution obtained to dryness.

The washing in the osmotic apparatus can, for instance, be effected by placing the pasty precipitated indigo from the filter into a vessel with parchment walls, surrounded by a second vessel through which warm water is circulating.

Now what I claim is:—

1. The process of producing indigoid coloring matters in a coloidal form soluble in water by passing air through a cold solution of a leuco compound of one of the said coloring matters in the presence of a salt of an aromatic acid, the air being passed so slowly through the solution that an oxidation to the coloring matter is effected, but a separation of the coloring matter is avoided.

2. The process of producing indigoid coloring matters in a coloidal form soluble in water by passing air through a cold solution of a leuco compound of one of the said coloring matters in the presence of a salt of an aromatic sulfonic acid, the air being passed so slowly through the solution that an oxidation to the coloring matter is effected, but a separation of the coloring matter is avoided.

3. The process of producing indigoid coloring matters in a colloidal form soluble in water by passing air through a cold solution of a leuco compound of one of the said coloring matters in the presence of a salt of a benzylated amin sulfonic acid, the air being passed so slowly through the solution that an oxidation to the coloring matter is effected, but a separation of the coloring matter is avoided.

4. The process of producing indigo in a colloidal form soluble in water by passing air through a cold solution of a leuco compound of indigo in the presence of a salt of a benzylated amin sulfonic acid, the air being passed so slowly through the solution that an oxidation to indigo is effected, but a separation of the indigo from the solution is avoided.

In testimony whereof I have hereunto set my hand in the presence of two subscribing witnesses.

RUDOLF HUTZLER.

Witnesses:
J. ALEC. LLOYD,
JOSEPH PFEIFFER.